3,335,837
TWO PLATE CLUTCH WITH ENERGY BALANCED FACING MATERIAL

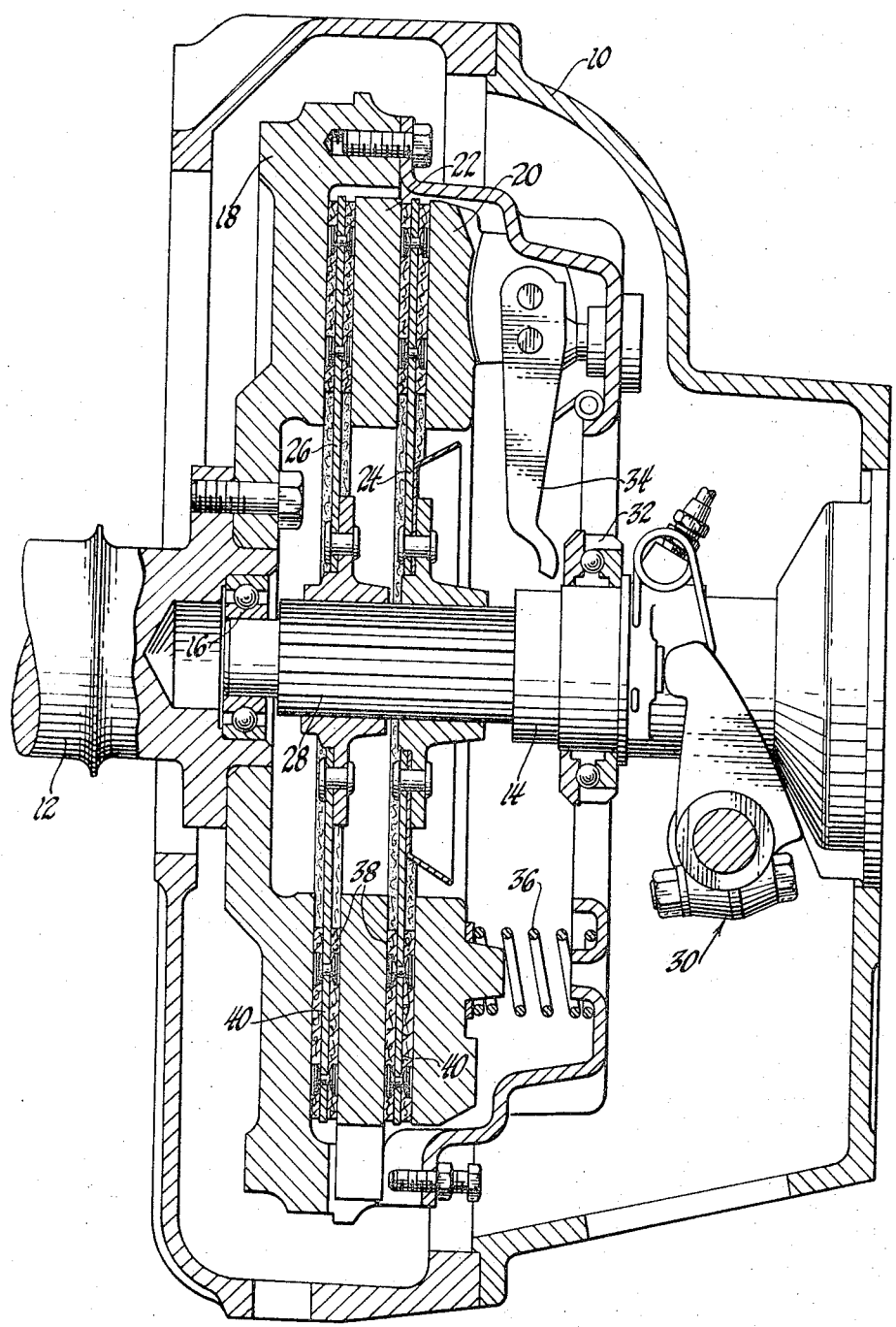

Gary L. Smith and Paul A. Bochnig, Pontiac, Mich., assignors to General Motors Corporation, Detroit, Mich., a corporation of Delaware
Filed Oct. 14, 1965, Ser. No. 496,014
3 Claims. (Cl. 192—113)

This invention relates generally to friction devices and more specifically to a friction clutch in which the frictional energy dissipated to the drive members is balanced.

In accordance with this invention, a friction torque device comprising a plurality of interleaved members having pairs of engaging friction surfaces is constructed with the relative values of the coefficients of friction of the friction surface pairs proportional to the relative heat dissipation capacities of the members that absorb heat from the pairs of friction surfaces.

In a conventional dual driven plate clutch comprising a backing plate or flywheel, an intermediate plate and a pressure plate as drivers and a pair of friction faced driven disks, application of the clutch will tend to produce overheating of the intermediate plate due to its double frictional contact with the driven disks. The clutch of this invention provides a more equal temperature balance between the drive plates by equalizing the frictional energy dissipated to them. This is accomplished by providing the driven disks with facings of frictional materials having different coefficients of friction so that the flywheel and pressure plates are contacted by frictional facings having a relatively high coefficient of friction, whereas the intermediate plate is contacted by frictional facings having a relatively low coefficient of friction.

A better understanding of this invention may be obtained by reference to the accompanying drawing, wherein the single figure is a side view of a clutch formed in accordance with this invention and broken away to show the details of construction.

A conventional two driven plate clutch is contained within a housing 10. A drive shaft 12 has a driven shaft 14 piloted thereby by a bearing 16. A rotatable but axially fixed backing plate or flywheel 18 is connected to drive shaft 12. An axially slidable pressure plate 20 and intermediate plate 22 are connected to the flywheel 18 by conventional means for rotation therewith. A pair of driven clutch disks 24 and 26 are interleaved with the flywheel 18, intermediate plate 22 and pressure plate 20 and are axially slidable on driven shaft 14 through a plurality of splines 28. A conventional clutch apply mechanism 30 is operable to disengage the clutched elements through a thrust bearing 32 and a plurality of release levers 34 attached to pressure plate 20 for axial movement against pressure springs 36.

Driven disks 24 and 26 are faced with frictional materials 38 and 40. During the process of clutch engagement, the frictional facings 38 and 40 will contact the driving plates 18, 20 and 22, thereby transferring frictional energy to them in the form of heat. Little heat is absorbed by disks 24 and 26, since the friction facings usually comprise abrasive particles mixed with an insulating carrier material. Since the intermediate plate 22 is contacted by two frictional elements, it will thereby attain a higher temperature than the flywheel and pressure plate which are contacted by only one frictional surface each, if the frictional materials used for all the facings have the same coefficient of friction.

In order to equalize the temperatures of the driving plates the energy transferred to these elements must be balanced. Such a result is attained by providing the driven disks with inner facings 38 of a frictional material having a lower coefficient of friction than the outer facings 40.

For example, the inner facings may comprise a molded phenolic blend filled with asbestos and mica, as disclosed in Maierson et al. 2,954,853, having a relatively low coefficient of friction, while the outer facings may comprise similar material with more filler having a higher coefficient of friction.

Preferably in the clutch shown, the inner friction facings contacting the intermediate clutch plate will have a sufficiently lower coefficient of friction than the outer facings contacting the flywheel and pressure plate so that the frictional heat transferred during clutch engagement to each of the driving plates is proportional or substantially proportional to the heat dissipation capacity of these plates in their environment. Where the heat dissipation capacity of these driving plates is equal, it would be preferable to provide a coefficient of friction ratio of 2:1, i.e., the outer frictional facings would have a coefficient of friction twice that of the inner frictional facings, in order to equalize plate temperatures by equalizing the energy dissipated to them. The selection of the coefficients of friction will vary with each particular clutch design, depending on the heat dissipation characteristics of the driving plates which is a function of their composition, size and environment. During clutch engagement the temperature rise of these plates will, therefore, be equal or more nearly equal, thus reducing the maximum temperature of the intermediate plate to reduce the possibility of burning the contacting frictional facings, to permit higher torque capacity usage of the clutch and to provide improved durability.

Thus, it can be seen that the deleterious effect of excessive frictional heat transferred to the driving plates is obviated by the provision of frictional facings on the driven disks having different coefficients of friction.

The principles of this invention are applicable to a single plate clutch in which the intermediate plate and one driven disk are deleted. The friction facing contacting the driving plate having the higher heat dissipation capacity would have the higher coefficient of friction, the relationship of the coefficients dependent upon the relative heat absorption characteristics of the plates. This would produce a temperature equalization of the flywheel and the pressure plate and provide improved clutch durability and higher torque capacity. A more complex clutch with more than two driven disks and a plurality of intermediate plates could also be similarly constructed with similar results. Likewise, this invention is applicable to other types of clutches and to brakes. Other modifications and variations of the disclosed embodiments are possible without departing from the scope of the inventive principles set forth herein.

We claim:

1. A friction device having first means including a pair of end members and a first intermediate member, each of the end members having a contact surface and the first intermediate member having a pair of contact surfaces, and second means including a pair of second intermediate members interleaved with the first means members, each of the second intermediate members having a pair of friction elements mounted thereon to form a pair of contact surfaces each engageable with a first means contact surface, the friction elements contacting the end members having the same first coefficient of friction and the friction elements contacting the first intermediate member having the same second coefficient of friction, the first and the second means being relatively rotatable, and means for engaging the contact surfaces.

2. The friction device of claim 1, wherein the second coefficient of friction is lower than the first coefficient of friction.

3. In a clutch having driving means including two end driving plates each having a contact surface and an intermediate driving plate having opposed contact surfaces, the driving plates being coupled together for corotation, driven means including two driven plates interleaved with the driving plates and interconnected for corotation, each driven plate having opposed surfaces each opposite a driving plate contact surface, and means for engaging the driving and driven plates for corotation, the improvement comprising a first friction element having a first coefficient of friction mounted on each driven plate contact surface opposite the end driving plate contact surfaces, and a second friction element having a second coefficient of friction mounted on each driven plate contact surface opposite the intermediate driving plate contact surfaces, the first coefficient of friction being higher than the second coefficient of friction to equalize the temperatures of the driving members resulting from frictional engagement with the friction elements.

References Cited

UNITED STATES PATENTS

| | | | |
|---|---|---|---|
| 2,381,941 | 8/1945 | Wellman et al. | 192—113 X |
| 3,213,986 | 10/1965 | Smirl | 192—113 X |

MARK NEWMAN, *Primary Examiner.*

ARTHUR T. McKEON, *Examiner.*